US006216130B1

(12) United States Patent
Hougaard et al.

(10) Patent No.: US 6,216,130 B1
(45) Date of Patent: Apr. 10, 2001

(54) GEOGRAPHIC-BASED INFORMATION TECHNOLOGY MANAGEMENT SYSTEM

(75) Inventors: Todd R. Hougaard, Cove, UT (US); Steven Schimmelpfenning, Gardnerville, NV (US); Burk Royer, Webster, TX (US)

(73) Assignee: InGeo Acquisitions, Inc., Logan, UT (US)

( * ) Notice: Subject to any disclaimer, the term of this patent is extended or adjusted under 35 U.S.C. 154(b) by 0 days.

(21) Appl. No.: 09/295,897

(22) Filed: Apr. 21, 1999

Related U.S. Application Data
(60) Provisional application No. 60/082,858, filed on Apr. 24, 1998.

(51) Int. Cl.[7] ....................................... G06F 17/30
(52) U.S. Cl. ............................................. 707/10; 707/104
(58) Field of Search ....................... 707/104, 10; 701/208

(56) References Cited

U.S. PATENT DOCUMENTS

| | | | |
|---|---|---|---|
| 4,689,747 | 8/1987 | Kurose et al. | 701/200 |
| 5,682,525 | 10/1997 | Bouve et al. | 707/104 |
| 5,796,634 | 8/1998 | Craport et al. | 702/150 |
| 6,075,467 | * 6/2000 | Ninagawa | 340/995 |
| 6,138,155 | * 10/2000 | Davis et al. | 709/224 |
| 6,148,260 | * 11/2000 | Musk et al. | 701/200 |

OTHER PUBLICATIONS

Bourne, P. E. "Changing Your Web Ways", Digital Age, vol. 3, No. 3, p. 34(3), Mar. 1996.*

* cited by examiner

Primary Examiner—Jack Choules
(74) Attorney, Agent, or Firm—Workman, Nydegger & Seeley (57) ABSTRACT

Systems and methods for managing geographic and other data structures. Using an administrator application, an administrator identifies geographic data structures deemed to be of interest to an organization and compiles associated reference information. The reference information includes retrieval addresses and display information specifying the display format of the data structures. The administrator can establish relationships between the referenced geographic data structures, tabular data, or other data, which define the manner in which multiple data structures are to be displayed. These relationships can be expressed in geographic themes that specify an application and associated geographic and tabular data structures that can be displayed by the application. A user application allows the user to select geographic information of interest. The user application receives the address information and display information from the administrator application and establishes communication with the remote sources to retrieve the relevant geographic data structures. Using the display information, the user application displays the retrieved data structures. Users can view and, if permitted by user access credentials defined by the administrator, edit the displayed data. Multiple users in an organization can retrieve the geographic information, which is organized and referenced on an organization-wide basis.

43 Claims, 8 Drawing Sheets

GEOGRAPHIC-BASED INFORMATION TECHNOLOGY MANAGEMENT SYSTEM

RELATED APPLICATIONS

This application claims the benefit of U.S. Provisional Patent Application Ser. No. 60/082,858, entitled "Geographic-Based Information Technology Management System" and filed Apr. 24, 1998, which is incorporated herein by reference.

BACKGROUND OF THE INVENTION

1. The Field of the Invention

The present invention relates to systems and methods for organizing and retrieving geographic information, geographically related or linked information, and geographically associated programs. More particularly, the present invention relates to systems and methods for making geographic information available for display to a user by compiling reference information specifying retrieval addresses and display formats of geographic information, applications, and associated tabular data located at multiple data sources that are accessible via the Internet or other wide area or local area networks.

2. Prior State of the Art

Managing, organizing, and displaying geographic information using computers has become increasingly common. Such use of geographic information has proved to be valuable in many industries and organizations, such as governmental agencies, public utilities, and the like. Computer display of geographic information allows vast amounts of information to be efficiently communicated to users and also allows the geographic information to be easily edited.

With the recent explosive growth of the Internet, numerous geographic information resources at remote sites around the world have become instantly available to users, regardless of their location. Along with the increasing availability of geographic information, there has been a corresponding increase in the difficulty and complexity of referencing, organizing, and managing geographic resources. In order to retrieve geographic information using the Internet, the user or the retrieving computer must know the uniform resource locator (URL) or another address associated with the information. In addition, because there is no universally accepted display format for geographic data types, they may be configured according to any of a large number of display formats. Accordingly, in order to retrieve and display geographic information, a geographic information system (GIS) must have reference information relating to the geographic information and specifying at least the address and display format thereof.

Some basic GIS applications require the user to remember the location of relevant geographic information and to manually type in the information from (human) memory or hard copy in order to retrieve and display the information. There are also custom GIS applications which do not require user interaction to determine the location of information, but they are limited to a predefined set of data sources. Such approaches are inconvenient from the standpoint of the user or are restricted in the amount and variety of information that may be accessed. Several major geographic information system vendors have recently marketed open GIS applications, which include open platforms and which are compatible with a large number of display formats. While such open standards increase the amount of geographic information that is accessible to a user using a single application, they do nothing to facilitate the organization and interrelation of various geographic information sources and geographic data structures.

Many of the problems that are impeding the full potential and applicability of geographic information systems have not been adequately addressed by conventional approaches. There still exists the difficulty of sharing and making freely available geographic information to all interested users within an organization. Moreover, there is no geographic information system that can adequately coordinate the use and execution of multiple applications that may be needed to display geographic information originating from different data sources.

In view of the foregoing, there is a need in the art for systems and methods of organizing geographic information located at remote sources in such a way that it is easily accessible and displayable to users. It would be a further advantage if such methods could conveniently facilitate the exchange and distribution of geographic information to multiple users within an organization.

SUMMARY AND OBJECTS OF THE INVENTION

The present invention is directed to systems and methods for referencing, accessing, and displaying geographic information. According to the invention, a GIS administrator can create a body of reference information relating to geographic data structures stored at remote sources in order to make the data structures readily available to multiple users in an organization. The administrator can also define relationships between the referenced geographic data structures. The reference information and the defined relationships establish a framework by which the geographic data structures can be retrieved and displayed to users.

The reference information compiled by the administrator may relate to various properties and features of the geographic data structures. For example, the reference information may include address information allowing a user application executed by the user's computer to retrieve the geographic data structure from a remote source on the Internet or another wide area network. The reference information may also include display information defining the display format to be used by the user application to display the geographic data structure to the user.

The reference information can contain application information indicating the application to be used to display or edit the geographic data structure. The executable code associated with the application may be stored locally by the computer executing the user application, or instead may be stored at a remote site on the Internet or another wide area network. The administrator may also compile, as part of the reference information, user access filters defining the access credentials of various users in an organization and context filters that permit the user to obtain only the information that is relevant at the time of the user's request. Metadata, which is data describing when the geographic data structure was created, by whom it was created, how it can be used, or other information about the geographic data structure, may be included in the reference information.

By compiling the reference information and establishing the relationships between referenced geographic data structures, the administrator has organized the data structures so that they can be conveniently retrieved and displayed by the user application. In particular, the user application presents menu choices, lists, or other selection mechanisms to the user indicating what geographic information is available to the user. When the user selects the geographic information to be retrieved, the user application receives the reference information associated with the relevant geographic data structures. The user application then establishes communication with the remote sources that store the geographic data structures using the address information. The geographic data structures and any applications not already stored locally are retrieved from the remote sources. Using the display information, the user application displays the geographic information to the user. In addition to geographic information, the systems and methods of the invention can be used to organize, manage, retrieve, and display tabular data and other data, such as graphics, audio and video.

Compiling the reference information and establishing the relationships between referenced geographic data structures in the foregoing manner provides significant advantages not available using prior art systems and methods. The selection of tabular data sources, or databases, can be based on the nature of the data in the database and its usefulness for presenting on a map the significance or attributes of one or more specific geographic features. For example, the data contained in the database can be used to draw a map in a specified way, or it can be displayed tabularly (in writing) as pertaining to particular map features.

In addition, the geographic data, tabular data, and applications are typically selected by the administrator based on the relationships between them. For example, to depict a map to a user, applications need the geographic data and tabular data to be available at the user's computer. Thus, the administrator can compile the reference information in such a way that, when a user executes an application, the appropriate tabular data and geographic data can be automatically accessed by the application. In this way, the user is relieved of the task of finding and/or entering the necessary geographic and tabular data as has been practiced in the prior art.

When the geographic and other information is displayed to the user, the information may be viewed and, if permitted by the user access credentials, edited. Any changes made to one geographic or tabular data structure can be passed to other data structures in order to coordinate and simplify the process of editing the information. Furthermore, the systems of the invention allow multiple users in an organization to access geographic and other information, including information edited by other users, on an enterprise-wide basis, thereby eliminating the duplication of effort that could otherwise occur if users were to maintain individual information management and organization systems. Having an administrator identify geographic data structures located at remote sites and compile the reference information associated therewith allows the system to meet the specific needs and interests in organizations. The invention also permits a wide variety of data having different formats and data sources to be correlated and displayed in useful ways.

Additional objects and advantages of the invention will be set forth in the description that follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention is directed to systems and methods for managing, organizing, and retrieving geographic and other data. The invention allows an administrator to identify geographic, tabular, and other data structures and establish an index of the data structures, whereby they may be retrieved, displayed and, optionally, edited by multiple users in an organization. The data structures may be located at remote data sources on the Internet or other wide area networks. Furthermore, the geographic and other data structures may have substantially any display schema. The invention allows enterprises to organize geographic information that is specifically determined to be of interest to the enterprise. Furthermore, the invention reduces the duplication of effort that could otherwise occur if users were to maintain individual geographic information indexing and management systems.

Certain embodiments of the invention will be described herein in the context of one or more computers capable of executing selected steps of the invention. For example, embodiments of the invention can be embodied in computer-readable media having computer-executable instructions or data structures stored thereon. "Computer-readable media", as used herein, extends to any structure or device capable of being accessed by a computer and capable of having its contents read by the computer. Examples of computer-readable media include, but are not limited to, magnetic storage devices and optical storage devices. "Computer-executable instructions", as used herein, include code, instructions, or data capable of causing a computer to execute certain operations or steps of the methods of the invention. Computer-readable media having computer-executable code constitute an example of program code means for performing steps of the methods of the invention.

Embodiments of the invention will also be described in reference to computer applications or computer program modules. "Computer applications" are defined to include executable instructions capable of being executed on a computer in order to cause the computer to organize or process data or to otherwise perform certain steps of the invention. Computer applications can also be understood to extend to the particular graphical display or other user interface by which the user receives information from and interacts with the computer. Program modules comprise computer-executable routines designed to cause a computer to perform one or more specific tasks within a larger computer program or system.

The invention may be implemented on a single computer, or instead may be practiced in a distributed computing environment, in which tasks are distributed among two or more processors linked in a network architecture. As discussed in greater detail below, the invention may be practiced in the context of the Internet, with geographic and other data structures that are stored at remote data sources at various sites in the Internet being indexed and retrieved by local computers. In addition, the invention may be further practiced in a client/server architecture. For example, a GIS administrator may compile, at a server system, reference information associated with geographic data structures stored at remote sites. One or more client systems, operated by individual users within an organization, may be used to retrieve the reference information from the server system.

Figure 1:
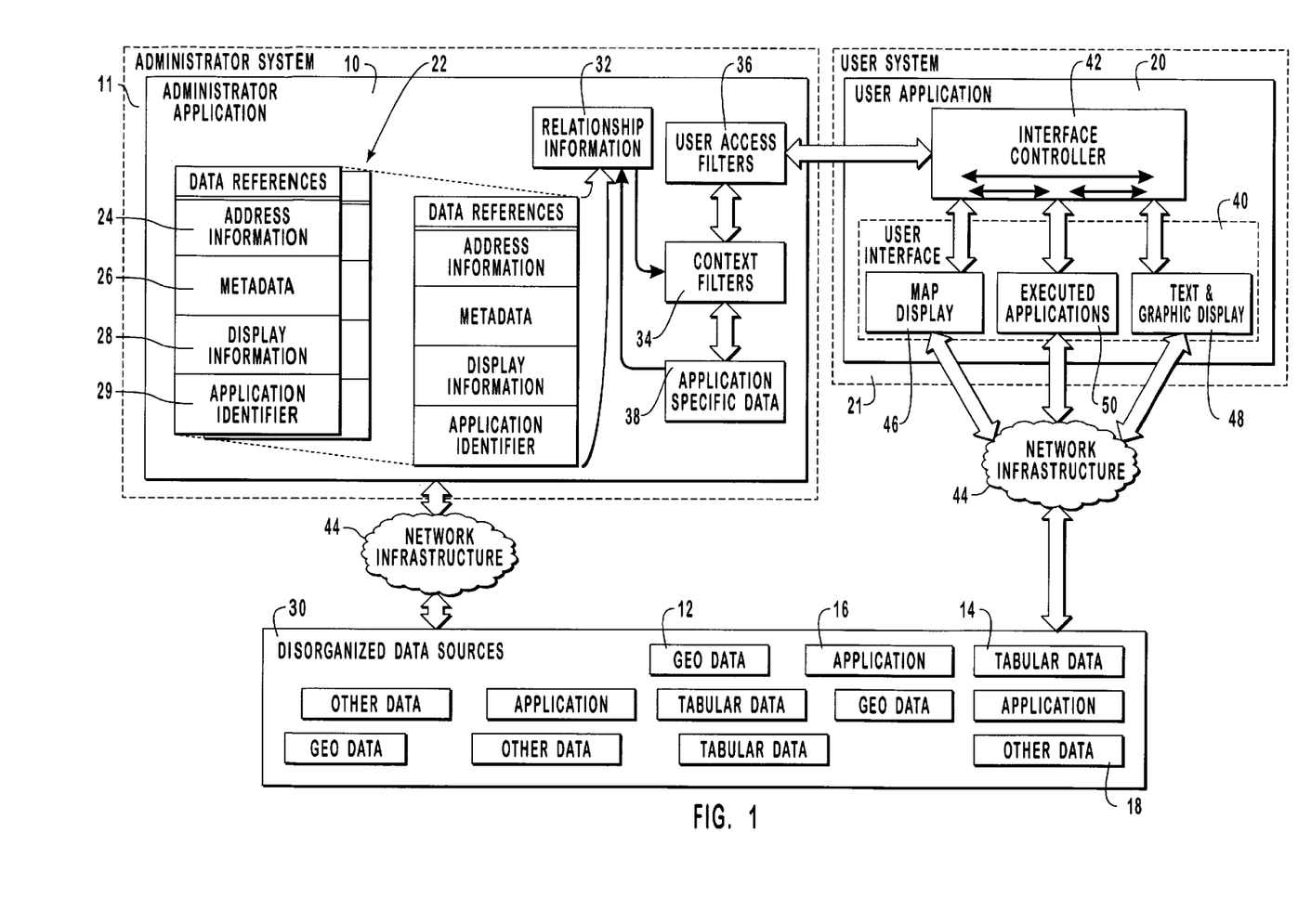
FIG. 1 is a schematic diagram illustrating a system of the invention for referencing and retrieving geographic, tabular, and other data structures stored at remote data sources.

FIG. 1 provides an overview of the architecture of one embodiment of the systems of the invention. In this embodiment, the system includes an administrator application 10 whereby an administrator organizes information referencing geographic and other data structures available at remote data sources. The user application 20 accesses the reference information generated by administrator application 10 and retrieves and displays the geographic and other data structures located at the remote sources.

Administrator application 10 is executed at a administrator system 11, while user application 20 is executed at a user system 21. Administrator system 11 and user system 21 may each be a separate computer or computer system. For example, administrator system 11 may be embodied in a server computer, while user system 21 may be embodied in a client computer in a network environment. In this configuration, multiple users may have access to the information compiled by administrator application 10 using a plurality of user applications 20, each installed on a separate client computer. Alternatively, administrator system 11 and user system 21 can be embodied in a single computer. The invention extends to systems wherein administrator application 10 and user application 20 are program modules of a single application program executed on one computer.

As shown in FIG. 1, the systems of the invention enhance the usability and accessibility of disorganized data sources 30, which may be located anywhere in the world. A GIS administrator uses administrator application 10 to identify, from disorganized data sources 30, the information that is of interest to individuals within the organization that is to be served by the systems of the invention. For example, the administrator may browse or otherwise search the Internet via network infrastructure 44. The disorganized data sources 30 may include geographic data 12, tabular data 14, application programs 16, and other data 18, such as graphical images, video, and audio. Depending on the interests of users within the organization, the administrator may choose to identify any number or type of data structures from disorganized data sources 30.

In one example, the organization to be served by the system of FIG. 1 may be a public utility. In this case, the geographic data 12 may represent maps of the region served by the public utility, including municipal boundaries, streets, and information relating to the physical infrastructure of the public utility. Tabular data 14 may include customer lists, while applications 16 may be software for displaying the geographic data and tabular data to users. Other data 18 may be any type of information that further pertains to the infrastructure or services provided by the public utility. Of course, the system of FIG. 1 may instead be used by essentially any other type of organization, and the data structures at the disorganized data sources 30 may be any type of data deemed to be of importance to the particular organization.

As the administrator locates the data structures of interest, he or she compiles a series of data references 22 that facilitate the subsequent retrieval and use of the data structures by users operating user application 20. In this embodiment, data references 22 include address information 24, which provides retrieval information to be used by user application 20 when retrieving the associated data structures. The address information 24 may be a uniform resource locator (URL) when disorganized data sources 30 are accessible via the Internet, or can instead be any other pointer. The data structures referenced by data references 22 may be located at different data sources, each having a different retrieval address.

The administrator also compiles metadata 26 that describes certain features of the associated data structures, thereby establishing a context for the data structure. For example, metadata 26 may describe what the data structure is, how, when and by whom it was created, and what it can be used for. Metadata 26 is particularly valuable in reference to geographic data structures 12, since the metadata can be used to describe the scope of the geographic data stored therein. Metadata 26 can help an administrator organize multiple data structures into useable combinations as further described below.

The data references 22 compiled by the administrator can further include display information 28 specifying the display format and other display properties of the data structures. When the data associated with display information 28 is a map encoded in a geographic data structure 12, the display information can specify, for example, map symbols, colors, line formats, and any other parameter that can be used to determine the appearance of the map. The data structures referenced by data references 22 may have different display formats. Moreover, more than one application program may be required to display the various data structures identified and indexed by the administrator.

Data references 22 further includes an application identifier 29 specifying a particular application that is related to the geographic data sources, tabular data sources, and other data sources listed in address information 29. Typically, the application of application identifier 29 uses the geographic, tabular, and other data referenced by address information 24 to present geographic information to the user in desired ways. Moreover, the geographic and tabular data listed in address information 24 is ordinarily selected by the GIS administrator based on the contents of the data and the interoperability of the data and the application represented by application identifier 29.

By compiling data references 22, the administrator establishes an index of useable data structures located at disorganized data sources 30 and makes the index available to any desired number of users in the organization. Referring again to the example of a public utility, the administrator can organize data references 22 to allow customer service representatives, maintenance dispatchers, and other interested users to conveniently retrieve and view the geographic information likely to be of importance to the public utility. In the absence of data references 22 and other information stored by administrator application 10, individual users in the organization would be required to locate and organize the geographic data 12 and other data structures, thereby engaging in inefficient duplication of effort.

In addition to merely locating referencing data structures 12, 14, 16, and 18, the administrator application 10 allows an administrator to establish relationships between various data structures or combinations of data structures. To illustrate the concept of establishing relationships between data structures, an administrator in a public utility may identify three data structures. A first geographic data structure may include an encoded map of the streets, municipal boundaries, and other features of a portion of the geographic region of service of the public utility. A second geographic data structure may include, for example, a representation of the infrastructure of the public utility. A tabular data structure may list customers of the public utility along with the customers' addresses. The administrator, in this example, decides that users within the public utility would be interested in viewing a map wherein the images of the two geographic data structures are combined. Moreover, the administrator may determine that users in the public utility would be interested in viewing or otherwise using the tabular customer data when viewing the map associated with the two geographic data structures.

In order to facilitate the combined use of the two geographic data structures and the tabular data structure, the administrator can specify the relationship between the data structures in relationship information 32. A detailed description of one technique for organizing and establishing relationships between data structures is presented below in reference to FIG. 2.

Referring to FIG. 1, the administrator application 10 also compiles other information that allows users to access the appropriate data indexed by data references 22. The administrator can configure context filters 34, which permits the users to receive only the geographic and other data that is relevant to them a that time that the requests for data are made. The administrator can also configure user access filters 36, which constitute a security mechanism for allowing only authorized users to access the geographic and other data. The administrator can compile application specific data 38, which specify application specific paths or mode information required to display tabular data or other types of data. The application specific data 38 allow tabular and other data to be conveniently displayed to the user without the user having to manually specify the application specific paths or mode information. In summary, the information compiled by the administrator using administrator application 10 organizes data structures 12, 14, 16, and 18 located at disorganized data sources 30 in a manner to make them accessible to users of the system of FIG. 1.

User application 20 comprises a user interface 42 generated on, for example, a computer display screen. User interface 42 presents menus or other selection mechanisms that permit the user to indicate the desired geographic, tabular, and other information. The user interface may display a list of the data structures associated with data references 22 and may further present a list of projects and views, which represent combinations of related data structures as defined in relationship information 32. Projects and views are further defined and described below in reference to FIG. 2.

Referring again to the example of the public utility, an employee operating user application 20 may select a particular set of data structures by selecting, for example, one of the projects or views defined in relationship information 32. The selected set of data structures may comprise any combination of geographic data structures 12, tabular data structures 14, application program 16, and other data 18. Interface controller 42 communicates the user's selection to administrator application 10. User access filters 36 determine whether the user is authorized to retrieve the selected information based on authorization parameters associated with the user. The appropriate address information 24, metadata 26, and display information 28 compiled in data references 22 are passed to the interface controller 42 via context fillers 34. Depending on the identity of the user making the request, the time of the request, or other factors, context filters 34 selectively allow the relevant portions of the requested data references 22 to be transmitted to interface controller 42. If needed, appropriate portions of application specific data 38 are also sent to interface controller 42. At this point, user application 20 has obtained the information needed to retrieve, display, and interrelate the data structures requested by the user.

User application 20 establishes communication with selected data sources of disorganized data sources 30 based on the address information 24 provided by administrator application 10. Communication with disorganized data sources 30 may be established using the Internet or any other suitable network infrastructure 44. Alternatively, some or all of the data structures to be retrieved may be located locally at the computer executing administrator application 10 or user application 20.

The requested geographic data structure 12, tabular data structure 14, application 16, other data 18, or combinations of the foregoing, are transmitted to user application 20. Based on display information 28 provided by administrator application 10, user interface 40 generates a map display 46 to generate the maps encoded in the retrieved geographical data structures 12. Likewise, the retrieved tabular data structures 14 and other data structures 18 may be displayed or otherwise represented in a text and graphics display 48 at user interface 40. The display of maps, text, and graphics may be performed by executed applications 50, which may have been retrieved from disorganized data sources 30 or may be stored locally at the computer executing user application 20.

Figure 2:
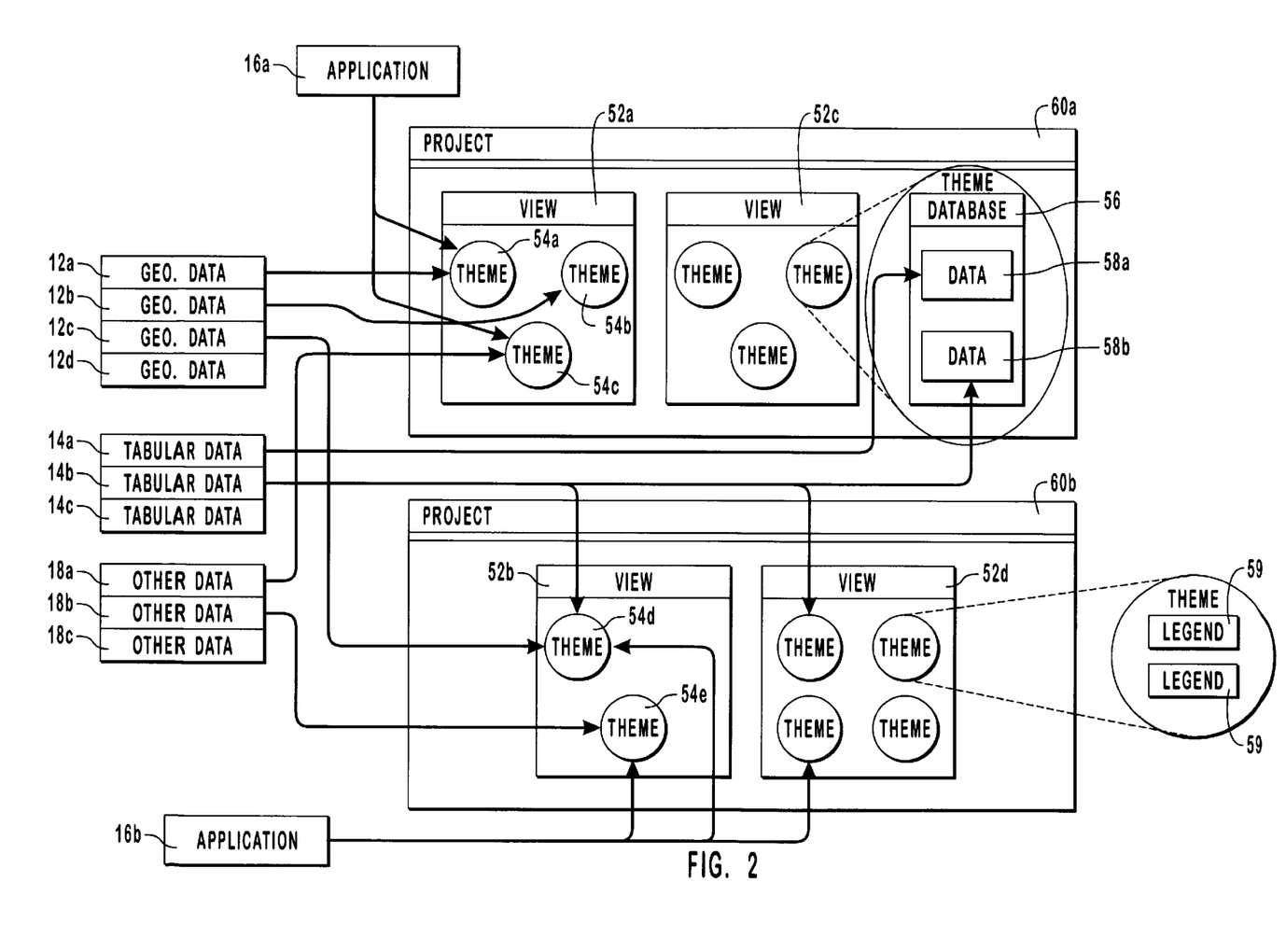
FIG. 2 illustrates one example of a system for organizing and establishing relationships between the geographic, tabular, and other data structures.

As shown in FIG. 1, interface controller 42 allows the map 46 to communicate with applications 50 and the data of text and graphic display 48. For example, if map 46 is modified in a way that is intended to cause changes in applications 50 or the data of display 48, interface controller 42 facilitates communication between these components. For example, if something changes on the map (e.g., by selecting a feature of interest on the map), the application has the ability to respond by calling up data out of the database that relates to the selected feature. Or, conversely, if the user initiates some kind of query or action inside the application, the map can react by changing the way it is displayed or showing different geographic features. By having each component notify the interface controller of its changes, the other components are notified and thus given their chance to react to the event. The ability of the map 46 to communicate with applications and data by means of interface controller 42 can be further illustrated by referring again to the public utility example. Perhaps a customer service representative is permitted to update customer information displayed in text and graphic display 48. In this case, text and graphic display 48 can communicate with map display 46 using interface controller 42 to depict on a map the new customer information. Moreover, maintenance personnel may be allowed to update the infrastructure map shown on map display 46 after the infrastructure has been upgraded or expanded. If so, map 46 can communicate these changes to tabular data associated with display 48 using interface controller 42. FIG. 2 depicts one approach for organizing and establishing relationships between various data structures that have been indexed according to the system of FIG. 1. In particular, the relationships depicted in FIG. 2 may be defined in relationship information 32 compiled by the administrator of the system. Accordingly, a user of user application 20 can select any of the projects, views, or databases depicted in FIG. 2. The system for establishing relationships between data structures shown in FIG. 2 is presented for illustration purposes only and other organization schemes can be used with the invention.

In the example of FIG. 2, an administrator has compiled data references associated with particular geographic structures 12, tabular data structures 14, applications 16, and other data structures 18. Relationships between some of the data structures have been established to allow the selected data structures to be displayed and otherwise processed together in a useful manner. The term "theme" is defined herein to include a set of geographic information with appropriately described security and display information and to further include associated databases and associated applications (which might use any or all of the associated databases). In this example, each theme generally includes information encoded in one of the data structures 12, 14, and 18, such as a map, a table, a graphical image, video, or the like. As used herein, "view" is defined to include one or more related themes that are to be displayed to a user or otherwise processed together. "Geographic data view" is a subset of the term "view", and is defined as a view that includes at least one theme associated with a geographic data structure. As used herein, the term "database" is defined to include one or more sets of data associated with tabular data structures 14. The term "project" is defined as to include one or more related views, databases, or combinations thereof Each view, database, and project may further be associated with one or more applications 16, which are used to display or process at least one of the component themes or data.

In FIG. 2, an administrator has determined that a combination of geographic data structures 12a and 12b and other data structure 18a would be of interest to a user. Accordingly, the administrator has defined a view 52a comprising themes 54a, 54b, and 56a associated with geographic data structures 12a and 12b and other data structure 18a, respectively. An application 16a, which is to be used to display or process at least one of the themes of view 52a, is also associated with the view.

When a user selects view 52a using user application 20 of FIG. 1, the data references, including the address information, metadata, and display information, associated with geographic data structures 12a and 12b and other data structure 18a are passed to the user application. Thereafter, the user application retrieves the specified data structures via network infrastructure 44 so that the retrieved data structures can be displayed together on user interface 40.

Application association information specifying that the computer-executable instructions associated with application program 16a are to be used to display or process the themes of view 52a is also sent to user application 20 when the user selects view 52a. According to one embodiment, the application association information constitutes a portion of the relationship information 32 of FIG. 1. If a copy of the executable code of application 16a is not stored locally at user system 21 or administrator system 11, it is retrieved from a remote source using application address information, which is one example of the address information 24 of data references 22 of FIG. 1.

Likewise, the administrator has defined relationships in relationship information 32 of FIG. 1 to establish view 52b. View 52b includes theme 54d and theme 54e, which are associated with geographic data structure 12c and other data structure 18b, respectively. Application 16b is associated with view 52b. In a similar manner, the administrator has defined the themes that constitute views 52c and 52d, although the corresponding data structures are not shown in FIG. 2 for purposes of clarity. The administrator has further specified in relationship information 32 of FIG. 1 that a database 56 includes sets of data 58a and 58b associated with tabular data structures 14a and 14b, respectively.

In the example of FIG. 2, the administrator has defined project 60a to include view 52a, view 52c, and database 56 based, for example, on a determination that these views and the database are directed to related subject matter. Likewise, the administrator has specified that project 60b includes view 52b and view 52d. Grouping views and databases into projects further communicates to the user which data structures are interrelated and allows the interrelated data structures to be conveniently retrieved, viewed and, optionally, edited.

FIG. 2 also illustrates that each theme can include zero or more legends 59. Each legend 59 includes one or more renderers that causes the application to display particular geographic information in designated ways.

According to one embodiment, themes 54 are defined by first specifying a set of geographic data stored at geographic data sources 12 and indicating how the data is to be displayed. Next, tabular data stored at tabular data sources 14 are associated with the theme, thereby becoming a dependent object of the theme. The administrator typically selects the tabular data for its usefulness in presenting or describing the significance or attributes of particular geographic features. For example, tabular data included in a theme 54 can be used to draw a map in a particular way, or it can be displayed tabularly (in writing) as pertaining to particular map features.

Tabular data included in a theme 54 can also be used to supply the data needed to allow an application to operate. Typically, when an application is loaded, the application must connect to a source of appropriate geographic data and/or tabular data. Including selected geographic data and tabular data in a theme allows the data to be automatically retrieved from its data sources 12 and 14 without requiring the user to find the data sources or to otherwise attend to making the data accessible by the application. Thus, by defining particular geographic data and tabular data in a theme 54, the application is able to conveniently connect to the data source.

Figure 3:
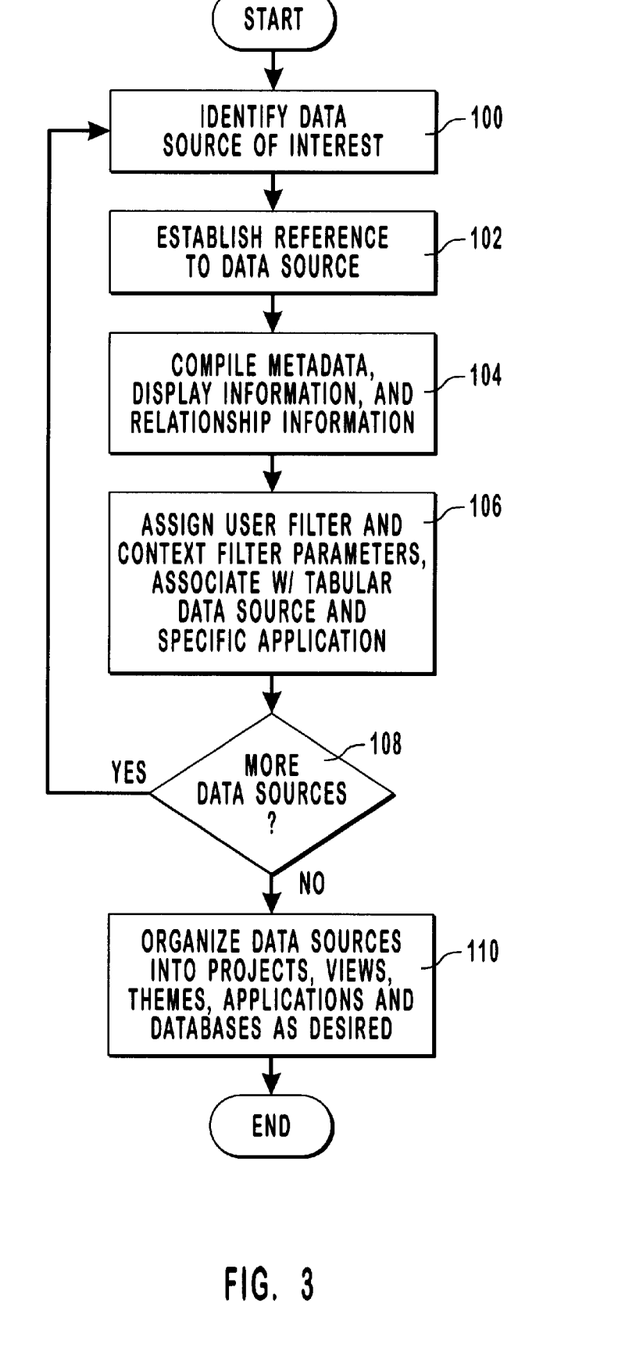
FIG. 3 is a flow diagram depicting a method of identifying, referencing, and establishing relationships between geographic, tabular, and other data structures.

FIGS. 3–8 are flow diagrams depicting methods for managing, organizing, retrieving, or editing data structures using the system of FIG. 1 or other embodiments of the systems of the invention. FIG. 3 illustrates a method of generating the themes, databases, views, and projects of FIG. 2. In step 100, the administrator identifies data sources from which geographic or other data structures of interest can be retrieved. The identified data sources may be located at a local computer or at a remote computer accessible via the Internet or another network. The administrator establishes a reference to the data source in step 102 by storing a copy of the URL or other address with which a user can retrieve the identified data structure. In step 104, the administrator compiles metadata, display information, and relationship information regarding the identified data source as has been described herein. The administrator then records, in step 106, user filter and context filter parameters that identify authorized users and define the circumstances under which the associated data structures can be accessed.

According to step 108, if the administrator desires to organize other data sources, the method proceeds to step 100. In the alternative, the method advances to step 110, in which the identified data structures are organized into projects, views, themes, and databases, as has been described herein in reference to FIG. 2.

Figure 4:
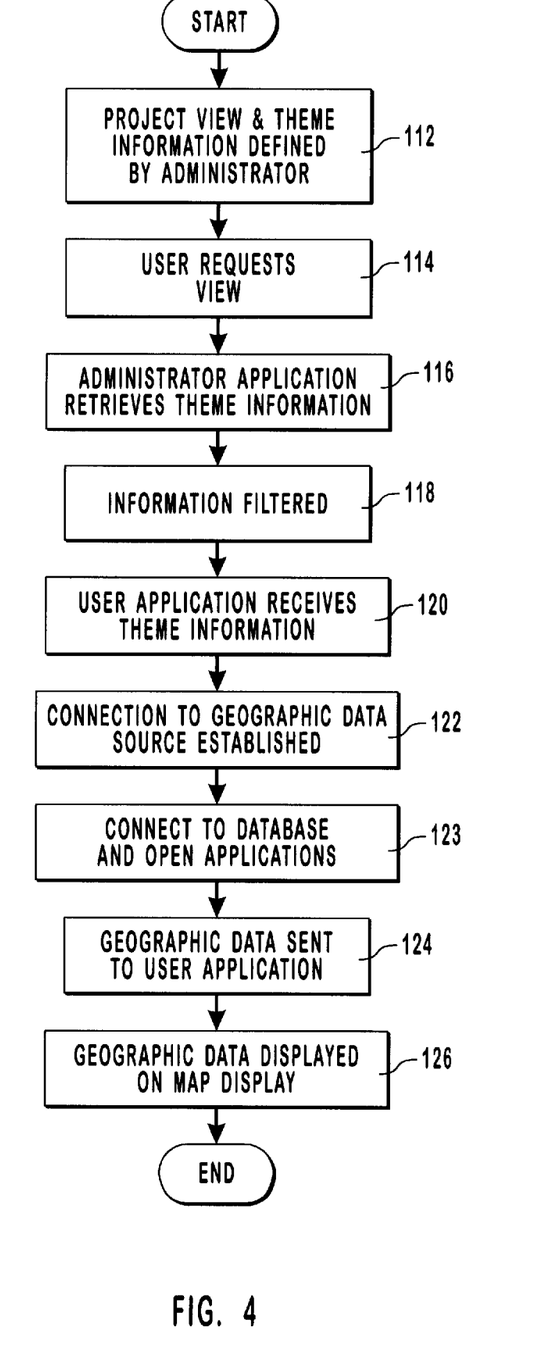
FIG. 4 is a flow diagram illustrating a method of requesting and displaying geographic information to a user.

FIG. 4 illustrates a method whereby a user accesses geographic and other data by using the information compiled by the administrator. In step 112, the project, view, and theme information is defined by the administrator as described herein. In step 114, the user is presented with a list of available projects and views from which the user requests a desired view. The request is transmitted to the administrator application, which retrieves the theme information in step 116. The theme information includes the address information 24, metadata 26, and display information 28 of FIG. 1 associated with the particular geographic and other data structures that constitute the selected view. In step 118, the information is filtered so that the user receives only that information that is determined to be relevant or to apply the security setting associated with the theme. In step 120, the user application receives the theme information from the administrator application.

Based on the address information retrieved from the administration application, the user application establishes a connection to the specified geographic or other data source and opens the applications that are related to the geographic theme (step 123). In step 124, the requested geographic or other data structure is sent to the user application. In step 126, the user application displays, on the map display or another component of the user interface, a representation of at least a portion of the geographic or other data structure. Steps 122, 123, 124, and 126 are repeated for each theme that constitutes the requested view. Displaying the retrieved data on the map display is conducted according to the display information associated with the particular geographic data structures.

Figure 5:
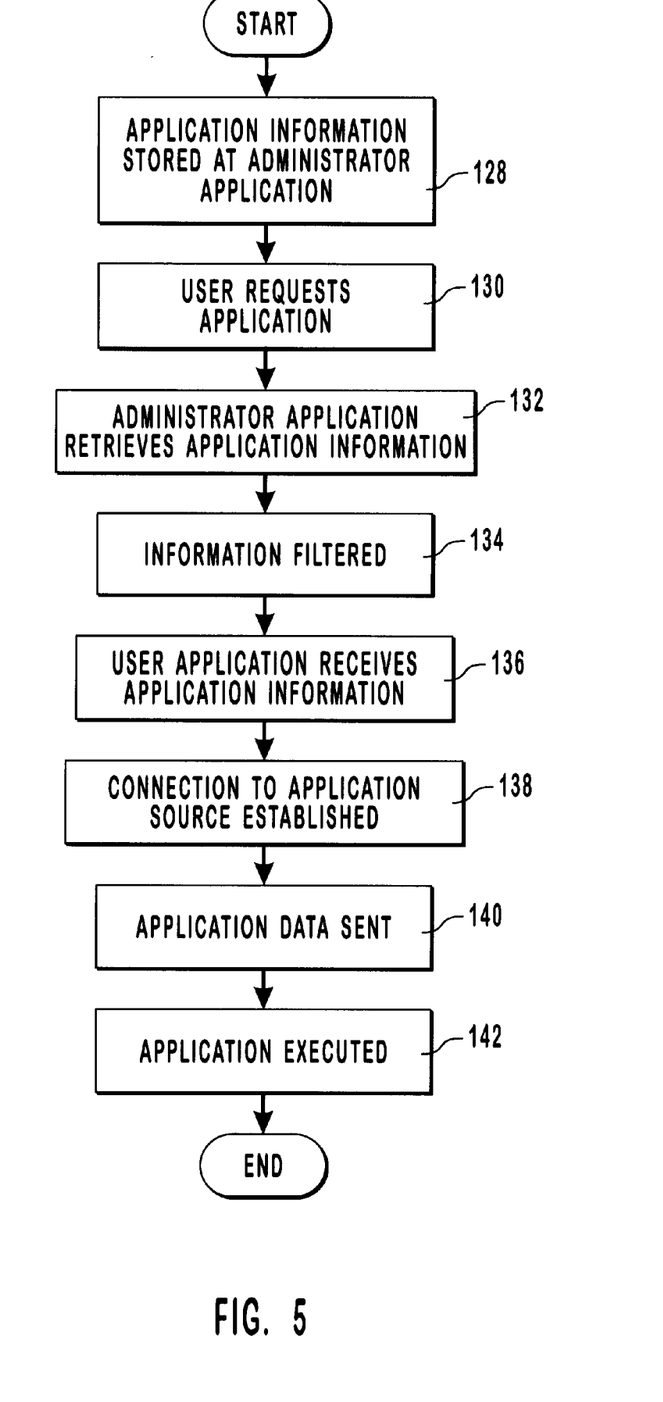
FIG. 5 is a flow diagram showing a method of requesting, retrieving, and executing an application that is used to process geographic, tabular, or other data structures.

FIG. 5 illustrates a method whereby the user application retrieves an application from a remote source and executes the application. In step 128, the administrator compiles and stores application information, including application address information and the identity of any associated tabular data structure. In step 130, the user requests the application by, for example, requesting a theme associated with the application. In step 132, the administrator application retrieves the requested application information, which is filtered in step 134 by the context or user filters. Filtering in step 134 permits security settings defined in the theme to be applied. The user application then receives the application information, including application specific data, display information, and relationships to other data structures. If the application source associated with the requested application is not locally accessible by the user system, communication is established with the appropriate application data source in step 138, and the application connects to the associated database. In step 140, the executable code associated with the application is sent to the user application, after which the application is executed in step 142. Step 142 can further include accessing or retrieving the tabular, graphical, or other data that is to be displayed or processed by the executed application.

Figure 6:
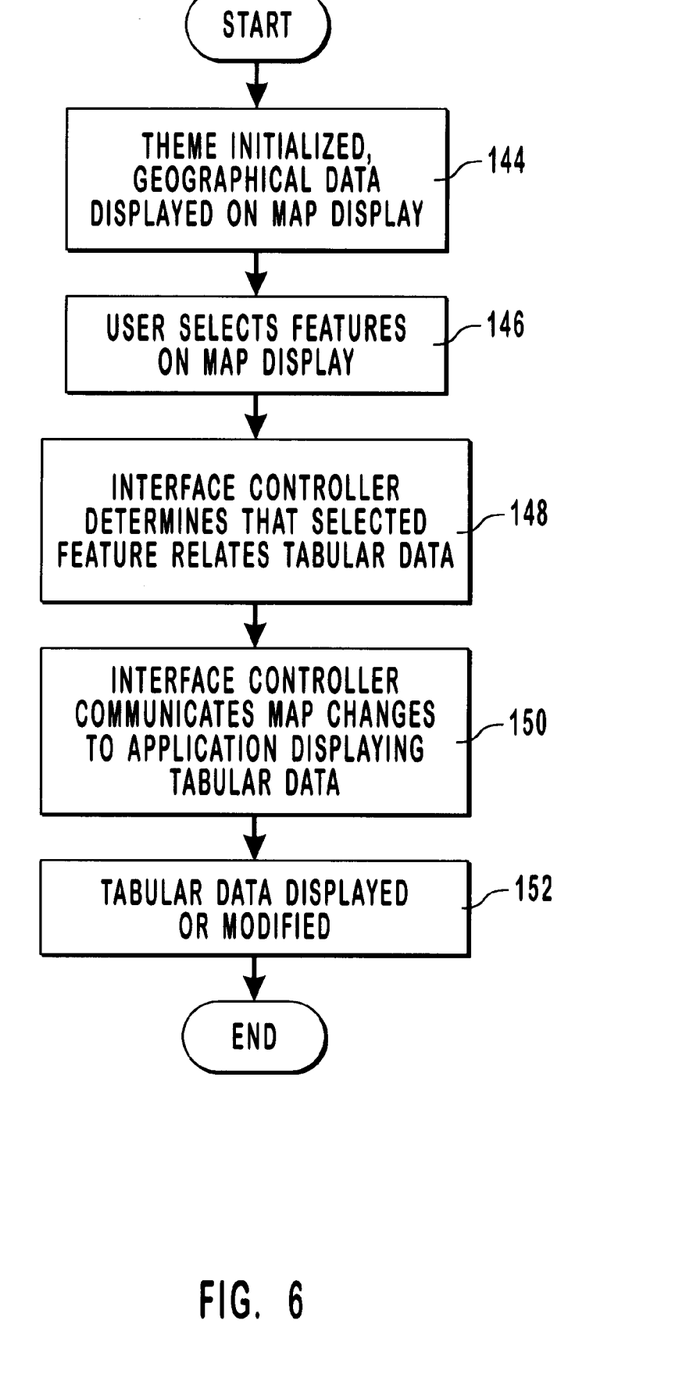
FIG. 6 is a flow diagram illustrating a method of editing tabular data based on changes made to geographic data according to the invention.

FIG. 6 illustrates steps of a method whereby geographic data and associated tabular data are edited. In step 144, a view and the component themes thereof are initialized as described in FIG. 4, and geographic data is displayed on a map display. In step 146, the user selects one or more features on the map display. Referring again to the public utility example, step 146 may involve an employee of the public utility selecting a symbol that represents a utility customer or an infrastructure component that is to be changed, added, or deleted. In step 148, the interface controller determines that the selected feature relates to tabular or other data. For example, if a public utility employee selects a symbol on the map display representing a utility customer, the interface controller may determine that the selected customer is also included in tabular data associated with the current view.

When the user edits the selected symbol, the interface controller communicates the map changes to the application displaying the tabular data in step 150. As shown in step 152, the tabular data associated with the map changes are then displayed, added, deleted, or otherwise modified as appropriate. In this manner, the systems and methods of the invention can facilitate interaction between displayed geographic and tabular information and can allow users to conveniently edit tabular data by modifying the displayed map.

Figure 7:
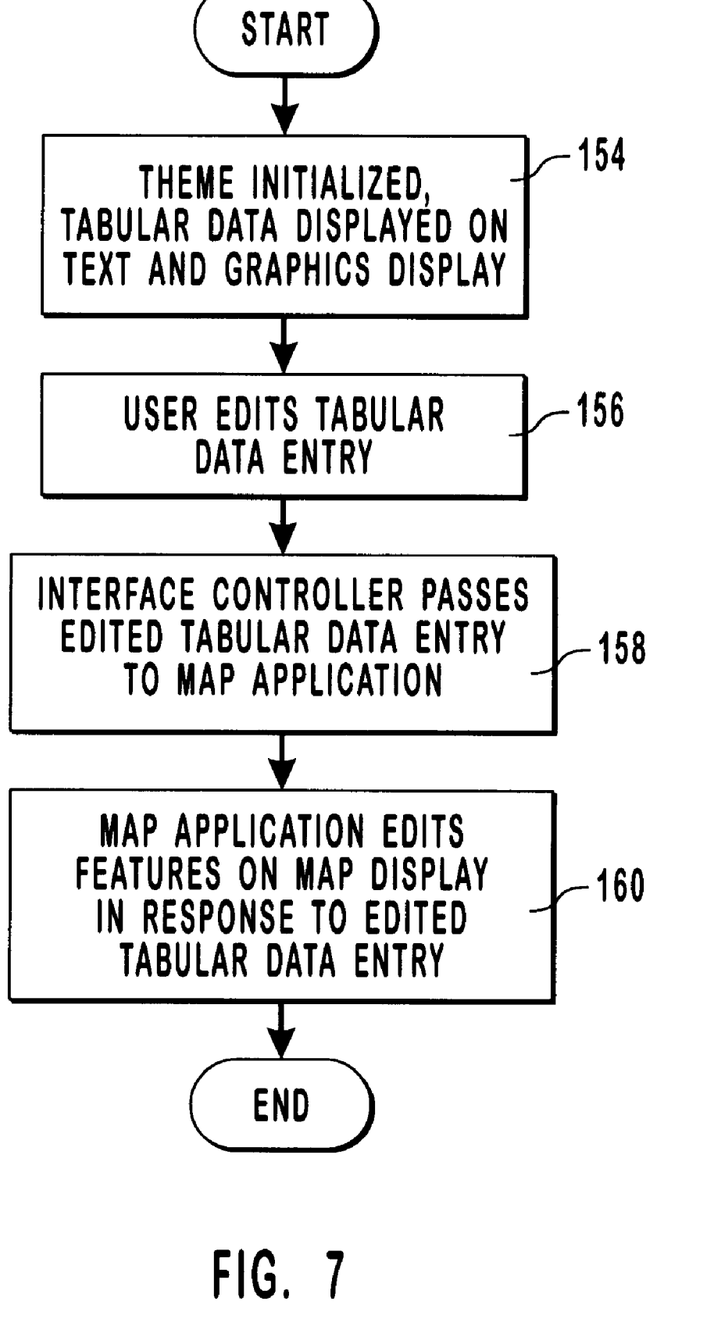
FIG. 7 is a flow diagram illustrating a method of editing geographic data based on changes made to tabular data according to the invention.

FIG. 7 illustrates a method whereby a user edits features on the map display by making the changes in the tabular data. In step 154, a view and its component themes are initialized and tabular data is displayed on the text and graphic display. In step 156, the user edits a tabular data entry. Referring again to the public utility example, an employee can add, delete, or modify customer information in the tabular data. In step 158, the interface controller passes the edited tabular data entry to the application used to display the map. In step 160, the map application edits features on the map display in response to the edited tabular data entry. In this manner, users can easily update geographic information by editing tabular data.

Figure 8:
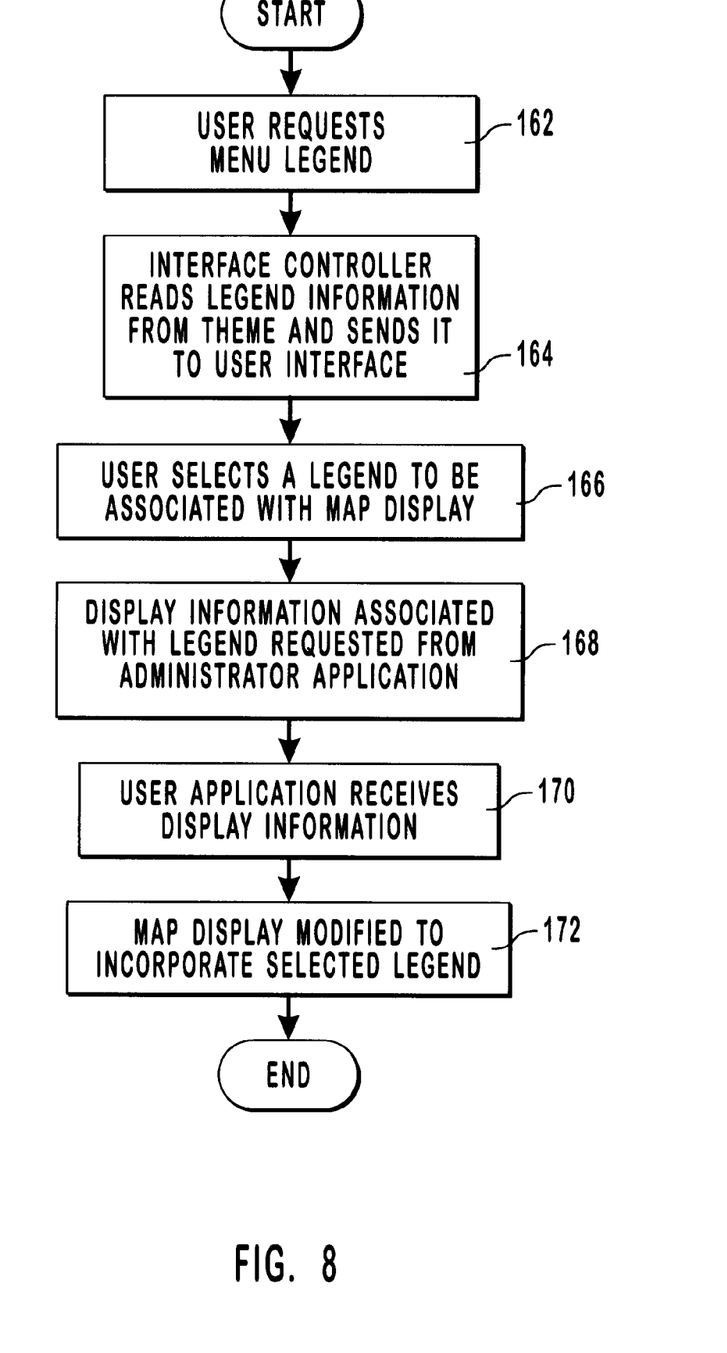
FIG. 8 is a flow diagram depicting a method of selecting and applying a legend to a map that is generated using one or more geographic data structures.

FIG. 8 depicts a method whereby a user selects the legend used to display geographic information on the map display. In step 162, the user requests a menu legend, which may be included in the display information associated with a particular geographic data structure. In step 164, the interface controller reads legend information included in the display information for the current theme and sends it to the user interface. In step 166, the user selects a legend to be associated with the map display. The user application then requests display information associated with the legend from the administrator application as shown in step 168. In step 170, the user application receives the legend display information. Finally, in step 172, the map display is modified to incorporate the selected legend in the displayed map.

The present invention may be embodied in other specific forms without departing from its spirit or other essential characteristics. The described embodiments are to be considered in all respects only as illustrative and not restrictive.

The scope of the invention is, therefore, indicated by the appended claims rather than by the foregoing description. All changes that come within the range of equivalency of the claims are to be embraced within their scope.

What is claimed and desired to be secured by United States Letters Patent is:

1. In an administrator system capable of accessing disorganized data structures located at remote data sources, the method comprising the steps of:

identifying a first geographic data structure, a first tabular data structure, an another data structure, and a plurality of application programs associated with the data structures;

compiling, at the administrator system, reference information specifying one or more properties for each of the data structures, the reference information comprising:

address information specifying a plurality of data sources from which a user system can retrieve the data structures;

display information specifying a format by which the user system can display a representation of at least a portion of the data structures; and application information specifying at least one computer-executable instruction associated with at least one application program stored at a remote application data source, the user system being capable of executing the computer-executable instruction to display a representation of each of the data structures retrieved from the data sources;

compiling, at the administrator system, relationship information specifying a relationship between at least two of the data structures such that the user system accesses the relationship information at the administrator system and subsequently accesses the data structures at the plurality of data sources defined by the relationship information and displays the data structures, in the format specified by the display information, using the application program retrieved from the remote application data source.

2. A method as defined in claim 1, further comprising the steps of:

identifying a second geographic data structure;

compiling, at the administrator system, address information specifying a second data source from which the user system can retrieve the second geographic data structure; and compiling, at the administrator system, display information specifying a second format by which the user system can display a representation of at least a portion of the second geographic data structure.

3. A method as defined in claim 2, wherein the first data source is different from the second data source.

4. A method as defined in claim 2, wherein the first format is different from the second format.

5. A method as defined in claim 1, further comprising the steps of:

identifying a tabular data structure; and compiling, at the administrator system, reference information relating to the tabular data structure, including address information specifying a tabular data source from which the user system can retrieve the tabular data structure.

6. A method as defined in claim 1, further comprising the step of defining a geographic data view at the administrator system, wherein the geographic data view specifies a relationship between the first geographic data structure and another data structure.

7. A method as defined in claim 6, further comprising the step of transmitting the geographic data view from the administrator system to a user application at the user system.

8. A method as defined in claim 1, wherein the user system and the administrator system are embodied in a single computer.

9. A method as defined in claim 1, wherein the user system is embodied in a client computer and the administrator system is embodied in a server computer.

10. In a user system capable of retrieving geographic data from a plurality of remote data sources, a method for accessing selected geographic data structures from one or more of the remote data sources in preparation for representing at least a portion of the selected geographic data structures on a display screen, the method comprising the steps of:

receiving, from a computer-readable medium at an administrator system:

address information specifying a plurality of data sources associated with a plurality of geographic data structure;

display information specifying a first format by which the user system can display a representation of at least a portion of the plurality of geographic data structure;

application information specifying a plurality of application programs stored at a plurality of remote application data sources by which the user system can display a representation of at least a portion of the plurality of geographic data structures retrieved from the plurality of data sources; and relationship information specifying a relationship between at least two of the data structures;

establishing communication between the user system and the plurality of data sources upon the user system retrieving the relationship information from the administrator system;

receiving, in compliance with the relationship information, the plurality of geographic data structures from the plurality of data sources; and displaying the representation of at least the portion of the plurality of geographic data structures using the first format and at least one of the application programs received from the plurality of remote application data source.

11. A method as defined in claim 10, wherein the computer-readable medium is located at a remote site with respect to the user system.

12. A method as defined in claim 11, further comprising, prior to the step of receiving the address information and the display information, the step of transmitting a request to an administrator system for the address information and the display information.

13. A method as defined in claim 10, further comprising the steps of:

receiving, from the computer-readable medium:

address information specifying a second data source associated with a second geographic data structure; and display information specifying a second format by which the user system can display a representation of at least a portion of the second geographic data structure;

receiving the second geographic data structure from the second data source; and displaying the representation of at least the portion of the first geographic data structure using the first format.

14. A method as defined in claim 13, further comprising, prior to the step of receiving the second geographic data structure, the step of establishing communication with the second data source, the first data source being different from the second data source.

15. A method as defined in claim 13, wherein the first format is different from the second format.

16. A method as defined in claim 10, further comprising the steps of:
   receiving, from the computer-readable medium, address information specifying a tabular data source from which the user system can retrieve a tabular data structure;
   establishing communication with the tabular data source;
   receiving the tabular data structure from the tabular data source; and
   displaying tabular data included in the tabular data structure.

17. A method as defined in claim 16, further comprising the step of associating the tabular data structure with the geographic data structure such that selection of an entry in the tabular data structure modifies the representation of at least the portion of the geographic data structure.

18. In a system including an administrator system and a user system capable of communicating with the administrator system, a method for displaying geographic data received from multiple remote data sources, comprising the steps of:
   storing, at the administrator system, reference information for each of a plurality of geographic data structures distributed at mulitple remote data sources, the reference information including:
      address information specifying a remote data source from which the user system can retrieve each of the plurality of geographic data structures;
      display information specifying a format by which the user system can display a representation of each of the plurality of geographic data structures; and
      application information specifying a plurality of computer-executable instructions associated with a plurality of application programs stored at a plurality of remote application data sources by which the user system can display a representation of each of the plurality of geographic data structures retrieved from the multiple remote data sources;
   storing, at the administrator system, relationship information specifying a relationship between at least two related geographic data structures;
   transmitting the reference information and relationship information from the administrator system to the user system;
   establishing communication between the user system and each remote data source specified by the address information;
   receiving at least one of the plurality of geographic data structures from the each remote data source and receiving at least one computer-executable instruction associated with each application program from a remote application data source; and
   displaying a representation of said one of the plurality of geographic data structures using a first format specified by the display information and at least one of the application programs specified by the application information.

19. A method as defined in claim 18, further comprising the step of compiling the address information and the display information at the administrator system.

20. A method as defined in claim 18, further comprising the steps of:
   establishing communication between the user system and a second remote data source specified by the address information, the second remote data source being different from the first remote data source; and
   receiving another of the plurality of geographic data structures from the second remote data source; and
   displaying a representation of said other of the plurality of geographic data structures.

21. A method as defined in claim 20, wherein a second format, different from the first format, is used to display the representation of said other of the plurality of geographic data structures.

22. A method as defined in claim 18, wherein the reference information is further associated with a tabular data structure, and wherein the address information specifies a tabular data source from which the user system can retrieve the tabular data source.

23. A method as defined in claim 22, further comprising the steps of:
   storing application address information specifying the remote application data source from which the user system can retrieve computer-executable instructions associated with the application program, the computer-executable instructions, when executed by the user system, being capable of displaying the representation and capable of displaying tabular data of the tabular data structure;
   transmitting the application address information from the administrator system to the user system;
   establishing communication between the user system and the remote application data source; and
   receiving the computer-executable instructions from the application data source.

24. A method as defined in claim 23, wherein the step of displaying the representation comprises the step of executing, by the user system, the computer-executable instructions.

25. In an administrator system capable of accessing geographic data structures located at remote data sources, a method for referencing the geographic data structures so that the geographic data structures are accessible by a user system, the method comprising the steps of:
   identifying:
      a first geographic data structure located at a first remote data source, the data of the first geographic data structure being formatted according to a first data convention that may be displayed by a user system using a first application program located at a first application data source; and
      a second geographic data structure at a second remote data source different from the first remote data source, the data of the second geographic data structure being formatted according to a second data convention different from the first data convention and that may be displayed by a user system using a second application program located at a second application data source; and
   compiling, at the administrator system, reference information relating to the first remote data source, the second data source, the first application data source and the second application data source, the reference information being sufficient to enable the user system, when the user system receives the reference information from the administrator system, to retrieve and display the first geographic data using the first application program and to retrieve and display the second geographic data using the second application program without further assistance from a user.

26. A method as defined in claim 25, wherein the reference information is further sufficient to enable the user system, when the user system receives the reference information, to display the first geographic data and the second geographic data without further assistance from the user.

27. A method as defined in claim 25, further comprising the step of defining a geographic data view at the administrator system, wherein the geographic data view specifies a relationship between the first geographic data structure and the second geographic data structure.

28. A computer program product for implementing a method of referencing geographic data structures located at remote data sources so that the geographic data structures are accessible by a user system, wherein the method is implemented in an administrator system, the computer program product comprising:
   a computer-readable medium having computer-executable instructions for performing the steps of:
      compiling address information specifying a first data source from which the user system can retrieve a first geographic data structure;
      compiling display information specifying a first format by which the user system can display a representation of at least a portion of the first geographic data structure;
      compiling application information specifying a first application program data source from which the user system can retrieve computer-executable instructions associated with the first application program that is configured to display the representation of at least a portion of first geographic data structure in the format specified by the display information; and
      initiating transmission of the address information, the display information, and the application information to the user system that is capable of retrieving the geographic data structures from the first data source.

29. A computer program product as defined in clam 28, wherein the computer-readable medium further has computer-executable instructions for performing the steps of:
   compiling address information specifying a second data source from which the user system can retrieve a second geographic data structure; and
   compiling display information specifying a second format by which the user system can display a representation of at least a portion of the second geographic data structure.

30. A computer program product as defined in claim 29, wherein the first data source is different from the second data source.

31. A computer program product as defined in claim 29, wherein the first format is different from the second format.

32. A computer program product as defined in claim 31, wherein the computer-readable medium further has computer-executable instructions for performing the steps of compiling address information specifying a tabular data source from which the user system can retrieve a tabular data structure.

33. In an administrator system capable of accessing geographic data structures stored at remote data sources, the geographic data structures representing data relating to the activities of a government agency, a method for providing at least one user located at a government agency access to the geographic data structures located at the remote data sources, the method comprising:
   an act of identifying a first geographic data structure, a first tabular data structure, an another data structure, and a plurality of application programs associated with the data structures, each of the data structures providing a government agency with data relating to the activities of the government agency;
   an act of compiling, at the administrator system, reference information specifying one or more properties for each of the data structures, the reference information comprising:
      address information specifying a plurality of data sources from which a user system can retrieve the data structures;
      display information specifying a format by which the user system can display a representation of at least a portion of the data structures to the at least one user located at the government agency; and
      application information specifying at least one computer-executable instruction associated with at least one application program stored at a remote application data source, the user system being capable of executing the computer-executable instruction to display to the at least one user located at the government agency a representation of each of the data structures retrieved from the data sources; and
   an act of compiling, at the administrator system, relationship information specifying a relationship between at least two of the data structures so that the user system can access the data structures at the plurality of data sources and display the data structures to the at least one user located at the government agency, in the format specified by the display information, using the application program retrieved from the remote application data source.

34. A method as recited in claim 33, wherein the government agency comprises a public utility.

35. A method as recited in claim 34, wherein the first geographic data structure comprises data selected from the group consisting of (i) an encoded map of at least one street, (ii) at least one municipal boundary, (iii) a representation of the infrastructure of the public utility, and (iv) at least one feature of a portion of a geographic region of the public utility.

36. A method as recited in claim 34, wherein the first tabular data structure comprises data selected from the group consisting of (i) a list of customers of the public utility and (ii) a list of customer's addresses for the public utility.

37. A method as recited in claim 33, further comprising an act of displaying the first geographic data, the first tabular data structure, and the another data structure simultaneously to the at least one user located at the government agency.

38. A method as recited in claim 33, further comprising an act of defining at least one project, the at least one project comprising a plurality of reference information.

39. A method as recited in claim 38, wherein the at least one project comprises a plurality of views and a plurality of themes.

40. A method as recited in claim 39, wherein the plurality of views incorporates the plurality of themes.

41. A method as recited in claim 39, wherein each of the plurality of themes comprises at least one of (i) a geographic data structure, (ii) a tabular data structure, (iii) an another data structure, and (iv) an application program.

42. A computer product for implementing a method for creating, at an administrator system, reference information associating a plurality of geographic data structures representing data relating to the activities of a government agency, the plurality of geographic data structures accessible directly by at least one user of a user system, the computer product comprising:

a computer readable medium carrying computer-executable instructions for implementing the method where the computer-executable instructions comprise:

a step for identifying a plurality of geographic data structures and a plurality of application programs associated with the plurality of geographic data structures, the plurality of geographic data structures representing data relating to the activities of the government agency;

a step for compiling address information specifying at least one data source from which the user system can directly retrieve at least one of the plurality of geographic data structures and at least one of the plurality of application programs;

a step for compiling display information specifying a first format by which the user system can display a representation of at least a portion of the plurality of geographic data structures relating to the activities of the government agency;

a step for compiling application information specifying a first application data source for at least one of the plurality of application programs, the first application data source storing at least one computer-executable instruction for at least one of the plurality of application programs; and a step for displaying the representation of the at least a portion of the plurality of geographic data structures to at least one user using at least one of the computer-executable instructions, the display of the at least a portion of the plurality of geographic data structures being defined by the display information and the plurality of geographic data structures and the computer-executable instructions directly retrieved from the data sources.

43. A computer product for implementing a method for creating, at an administrator system, reference information associating a plurality of geographic data structures representing data concerning the activities of a government agency, the plurality of geographic data structures accessible directly by at least one user of a user system, the computer product comprising:

a computer readable medium carrying computer-executable instructions for implementing the method where the computer-executable instructions comprise:

program code means for identifying a plurality of geographic data structures and a plurality of application programs associated with the plurality of geographic data structures, the plurality of geographic data structures representing data concerning the activities of the government agency;

program code means for compiling address information specifying at least one data source from which the user system can directly retrieve at least one of the plurality of geographic data structures and at least one of the plurality of application programs;

program code means for compiling display information specifying a first format by which the user system can display a representation of at least a portion of the plurality of geographic data structures relating to the activities of the government agency; and program code means for compiling application information specifying a first application data source from which the user system can directly retrieve computer-executable instructions associated with at least one of the plurality of application programs, so that the user system can display the representation of at least a portion of the plurality of geographic data structures in the format specified by the display information using at least one of the plurality of application programs.

* * * * *